Nov. 13, 1923. 1,474,068
G. W. CLARK
HAND BRAKE FOR CYCLES
Filed Sept. 21, 1921 2 Sheets-Sheet 1

INVENTOR
George W. Clark
BY Chapin & Neal
ATTORNEYS

Nov. 13, 1923.
G. W. CLARK
1,474,068
HAND BRAKE FOR CYCLES
Filed Sept. 21, 1921    2 Sheets-Sheet 2
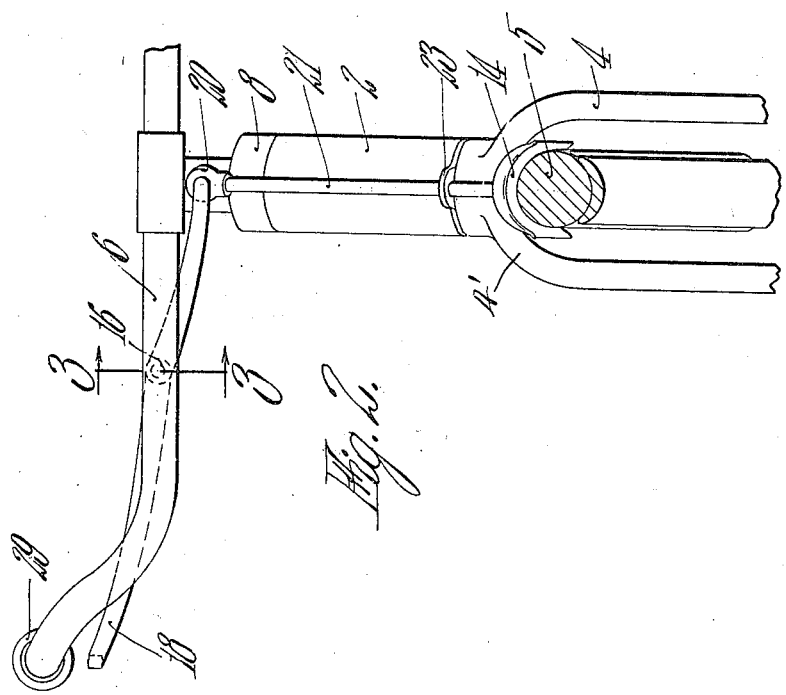
INVENTOR
George W. Clark.
BY
Chapin & Neal
ATTORNEYS.

Patented Nov. 13, 1923.

1,474,068

UNITED STATES PATENT OFFICE.

GEORGE W. CLARK, OF WESTFIELD, MASSACHUSETTS, ASSIGNOR TO WESTFIELD MANUFACTURING COMPANY, A CORPORATION OF MASSACHUSETTS.

HAND BRAKE FOR CYCLES.

Application filed September 21, 1921. Serial No. 502,117.

*To all whom it may concern:*

Be it known that I, GEORGE W. CLARK, a citizen of the United States, residing at Westfield, in the county of Hampden and State of Massachusetts, have invented new and useful Improvements in Hand Brakes for Cycles, of which the following is a specification.

This invention relates to hand brakes for cycles and more particularly to hand brakes for children's velocipedes and bicycles and has for its object the provision of such a brake mechanism of more efficient and durable character than has heretofore been devised.

A further object of the invention is to adapt a brake having the familiar operating devices of the common brake to the more particular requirements of a child's cycle and to protect the more intricate parts of the mechanism from being tampered with or broken.

Further objects will appear from the following description and accompanying drawing which show a preferred embodiment of the invention and in which, Fig. 1 is a side elevation of the front end of a cycle partly in section showing the brake mechanism applied thereto;

Fig. 2 is a front view of the same;

Figure 1:
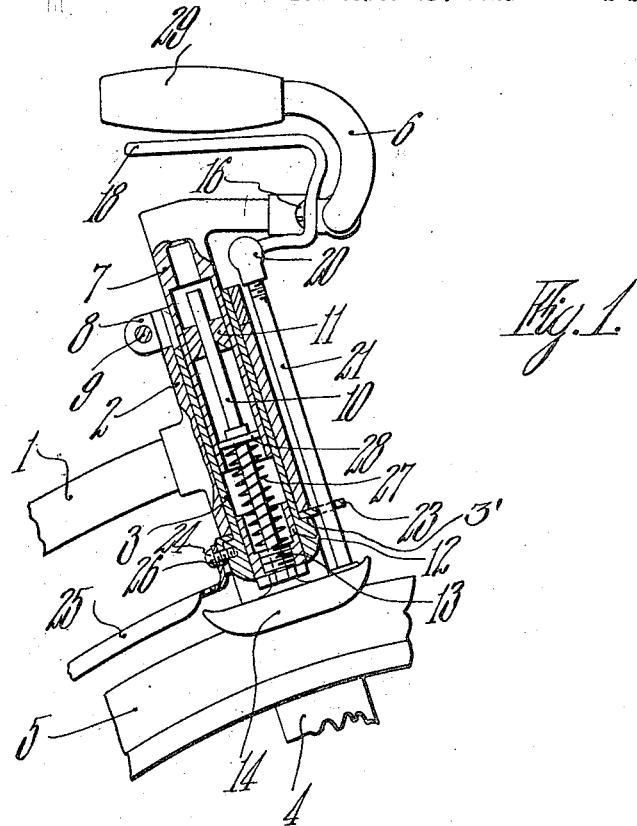
Figure 3:
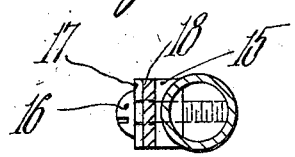
Fig. 3 is a detail section along line 3—3 of Fig. 2 showing the pivot bearing of the brake lever.

Referring to the drawings, the hand brake is represented as attached to a velocipede or bicycle of the usual construction in which 1 is the main frame having a hollow steering wheel head 2 in which the tubular steering wheel post 3 is swivelled, carrying at its lower end the crown 4' and steering wheel forks 4 which in turn carry the front wheel 5. Handle bars 6 are connected in the usual manner to a hollow stem 7 adapted for extension into the upper end of the steering wheel post 3 within the head 2. The stem 7 is securely clamped to the post 3 by a clamping collar 8 provided with a securing bolt 9. The steering post 3 is preferably compressible at its upper end due to a slot in same (not shown) partway its length so that it may be clamped by the collar 8 upon the handle bar stem 7 for the usual adjustments.

In the present embodiment of the invention a guide rod 10 is slidably mounted within the steering wheel head 2, the tubular steering wheel post 3 and the hollow handle bar stem 7 by means of a guide bushing 11 fixed in the stem 7 providing an upper bearing surface for the rod 10. A sleeve 12 is tightly fitted in the lower end of the steering wheel post 3 and extends up into the post a short distance. The sleeve 12 is internally threaded at its lower end to receive a headed bushing 13 which provides a lower bearing surface for the rod 10. At the lower end of the guide rod 10 a brake shoe 14 is affixed by any suitable means so that it will be closely adjacent to the underside of the crown 4' when held out of engagement with the wheel 5 by means to be described later.

Figure 4:
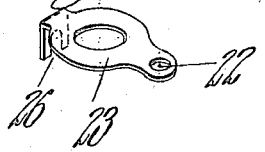
Fig. 4 is a detached perspective of the guide plate for the brake rod.

Pivoted to one arm of the handle bars about midway the length thereof, by means of a stud 15, screw 16 and washer 17 is a hand lever 18 extending laterally in contiguous relation to the handle bar and ending adjacent to a grip 29 of the handle bar, so that it may be conveniently grasped without removing the hand from the grip. The other end of the hand lever 18 is connected by a suitable swivelled joint coupling member 20 to the upper end of a brake actuating rod 21. As shown, the coupling member 20 is detachably connected to the hand lever 18 and is screw threaded on the brake rod 21 for suitable adjustments. This brake rod 21 is located in front of and outside the head 2 and is fixed by any suitable means to the forward end of the brake shoe 14 which extends beyond the forks 4. The brake rod 21 is guided for its vertical movement in an opening 22 formed in a guide and bearing plate 23 interposed between the lower end of the steering wheel head 2 and a shoulder 3' formed on the lower end of post 3 and affixed thereto by means of the lip 26 projecting downwardly from rear of said plate 23 as shown in Fig. 4. A screw 24 fastens the lip 26 to the post 3. The screw 24 may also secure the front end of a mud guard 25, to the post 3 as shown. The plate 23 also serves as a bearing surface between the shoulder 3' on the steering post 3 and the lower end of the steering wheel head 2. This plate is preferably made of hard metal and may be replaced should it become worn. Thus a suitable bearing surface is provided between these parts which can be easily removed with small expense.

The guide rod 10 is preferably provided with a spring 27 to normally hold the brake shoe 14 out of engagement with the wheel 5. This spring 27 surrounds the rod 10 and is interposed between the bushing 13 and an upper seat 28 provided at a suitable point on the rod in any manner as by means of a pin and washer arrangement as shown.

In operation the hand lever 18 is grasped by the hand while the latter is still on the handle bar grip. The hand lever 18 being pivoted at 16 and bent so that its other end forces down the brake rod 21 by means of the coupling member 20 causes the brake shoe 14 to engage the wheel 5, the guide rod 10 sliding in its upper and lower bearing surfaces 11 and 13 respectively. Upon releasing the hand lever 18, the tension of the spring 27 causes the guide rod 10 to lift the brake shoe 14 out of engagement with the wheel 5, and bring the hand lever 18 back to its original position.

It will be observed in the construction shown that the brake parts may be easily disassembled with a minimum of operations. A hand brake is provided for velocipedes or similar vehicles having the hand actuating mechanism largely in exposed position and the spring actuated means housed and therefore protected from being tampered with by an inquisitive child.

I claim—

1. The combination in a cycle having a handle bar and a hollow steering wheel head, of brake mechanism comprising a guide rod mounted within said head, a brake shoe carried on lower end of said rod, a brake rod outside of said head and directly connected at its lower end to said brake shoe, and a hand lever pivotally mounted on said handle bar and connected to the upper end of said brake rod for actuating said brake shoe.

2. The combination in a cycle having a handle bar and a hollow steering wheel head, of brake mechanism comprising a spring actuated guide rod slidably mounted within said head, tending to automatically release said brake, a brake shoe carried on lower end of said rod, a brake rod outside of said head and directly connected at its lower end to said brake shoe, and a hand lever pivotally mounted on said handle bar and connected to the upper end of said brake rod for actuating said brake shoe.

3. The combination in a cycle having a hollow steering wheel head, a steering wheel post swivelly mounted therein having a crown and fork, a steering wheel mounted in said fork, a handle bar connected with said post, of brake mechanism comprising a brake shoe for said wheel mounted within the sides of said fork and closely adjacent the underside of the crown of said fork, a spring actuated guide rod slidably mounted in said head and connected at its lower end to the central portion of said brake shoe, said spring actuated guide rod tending to hold said brake shoe out of engagement with said wheel, a brake rod mounted on the outside of said head and connected directly to the forward portion of said brake shoe and a hand lever pivotally mounted on said handle bar connected to said brake rod for actuating said brake shoe against said wheel.

4. The combination in a cycle having a hollow steering wheel head, a steering wheel post swivelly mounted therein having a fork at its lower end, a steering wheel mounted in said fork, a handle bar having a stem adjustably secured in said post, of brake mechanism comprising a spring actuated guide rod slidably mounted at its upper end in said stem and at its lower end in said post, said spring actuated guide rod carrying a brake shoe at its lower end and tending to hold said brake shoe out of engagement with said wheel, a brake rod guidably mounted on the outside of said post and directly connected to said brake shoe and a hand lever pivotally mounted on said handle bar adjustably connected to said brake rod for actuating said brake shoe against said wheel.

5. The combination in a cycle having a hollow steering wheel head, a steering wheel post swivelly mounted therein having a fork at its lower end, a steering wheel mounted in said fork, a handle bar having a stem secured in said post, of brake mechanism comprising a guide rod slidably mounted in said post, a guide bushing for the upper portion of said guide rod, a guide bushing for the lower portion of said guide rod, a spring seat fixed to said guide rod intermediate said upper and lower guide bushings and a spring interposed between said spring seat and lower guide bushing tending to raise said guide rod, the lower end of said guide rod being connected to the central portion of a brake shoe located between the sides of said fork, a brake rod located on the outside of said head and directly connected to the forward portion of said brake shoe, and a hand lever adjacent said handle bar connected to said brake rod for actuating the same.

6. The combination in a cycle having a hollow steering wheel head, a steering wheel post swivelly mounted therein having a shoulder at its lower end, a handle bar having a stem secured to the upper end of said post, of brake mechanism comprising a spring actuated guide rod slidably mounted within said post, a brake shoe carried on the lower end of said guide rod, a brake rod outside said head and directly connected at its lower end to said brake shoe, a hand lever pivotally mounted on said handle bar and connected to the upper end of said brake rod for actuating said brake shoe and a plate interposed between said shoulder and the lower end of said steering wheel head to act as a bearing surface therefor and having portions for securing same to said post and for guiding said brake rod.

In testimony whereof I have affixed my signature.

GEORGE W. CLARK.